United States Patent

Shimshi

[11] Patent Number: 5,901,804
[45] Date of Patent: May 11, 1999

[54] ENERGY WHEEL

[76] Inventor: Ezra Shimshi, P.O. Box 421011, Atlanta, Ga. 30342

[21] Appl. No.: 08/956,530
[22] Filed: Oct. 23, 1997
[51] Int. Cl.$^6$ ................................................. B60K 9/04
[52] U.S. Cl. ............................................................ 180/165
[58] Field of Search ................................ 180/165; 74/64; 188/135

[56] References Cited

U.S. PATENT DOCUMENTS

| | | | |
|---|---|---|---|
| 4,171,029 | 10/1979 | Beale | 180/165 |
| 4,276,951 | 7/1981 | Smitley | 180/165 |
| 5,085,088 | 2/1992 | Robinson | 180/165 |
| 5,244,054 | 9/1993 | Parry | 180/165 |
| 5,384,521 | 1/1995 | Coe | 318/161 |
| 5,427,330 | 6/1995 | Shimshi | 244/62 |
| 5,673,872 | 10/1997 | Shimshi | 244/62 |

FOREIGN PATENT DOCUMENTS

| | | | |
|---|---|---|---|
| 3011833 | 10/1981 | Germany | 180/165 |
| 1337592 | 9/1987 | U.S.S.R. | 180/165 |

Primary Examiner—Matthew C. Graham

[57] ABSTRACT

One object of the present invention is to avoid loss of energy during deceleration of a vehicle. Another object is to decelerate an aircraft after its landing and to utilize the energy of said deceleration to taxi that aircraft or for its immediate take-off. This invention can be incorporated in a wheel within which a plurality of energy collectors, or spheres 8', can be housed circumferentially and be so connected as to spin, each about its own axis 20, and to accelerate under the impact of centrifugal force 60 produced by the rotation of said wheel. Each sphere 8' can include two hemispherical chambers 21 that form that sphere. The hemispherical chambers 21 can spin faster than the column of fluid that parallels centrifugal force 60 which acts on that column of fluid in an outward direction along line 22". The accelerated speed of hemispherical chambers 21 is the product of centrifugal 60 impacting on the corresponding fluid in the respective hemispherical chamber 21, because there line 22" becomes perpendicular to centrifugal force 60. The higher speed of hemispherical chambers 21, than that of the column of fluid in each sphere 8', could force some fluid from each column of fluid to exit from the outward aperture 22 and the same amount of fluid to enter the inward aperture 22. This fluid movement can take place through the connecting tunnels 22' and through the spaces around each hemispherical chamber 21. The Energy Wheel has, therefore, clear advantage over other devices that recover energy for immediate use because it can be of light weight and can maintain the necessary storage capacity with a few components simply combined.

15 Claims, 8 Drawing Sheets

& nbsp;
ENERGY WHEEL

BACKGROUND OF THE INVENTION a) Field of the Invention

This invention relates to a class of devices which utilize their own rotation to accelerate spinning mass units, or spheres, within them when under the effect of centrifugal force produced by said rotation. One object of this invention is to conserve energy.

b) The Prior Art

The prior art has provided unique concepts upon which breakthrough technologies can be achieved so that more efficient machines could be devised that would conserve energy.

The most pertinent prior art known to the Applicant at the time of filing this his application is embodied in U.S. Pat. No. 5,427,330, Issued: Jun. 27, 1995, Inventor: Ezra Shimshi; and in U.S. Pat. No. 5,673,872, Issued: Oct. 7, 1997, Inventor: Ezra Shimshi.

SUMMARY OF THE INVENTION

One of the objects of the present invention is to provide apparatus that can be used to decelerate a moving vehicle, or an aircraft after landing, by storing the energy of said deceleration and recovering it to propel that vehicle, or to taxi that aircraft.

This invention can be incorporated in a wheel within which a plurality of spheres can be circumferencially housed. Each sphere can be so connected as to spin about its own axis and accelerate under the impact of centrifugal force produced by the rotation of said wheel. Each sphere can include two hemispherical chambers that form said sphere. Mass unit, or a column of fluid, within the front chamber can be moved relative to said chamber under the impact of said centrifugal force. The higher speed of the chambers of each sphere would force the slower moving column of fluid to release some fluid out of the outward aperture and to take in some fluid through the inward aperture. The higher speed of the chambers can be effected by the fluid, or mass unit, within the back chamber when under the influence of said centrifugal force. Circulation of fluid can be achieved through the connecting tunnels and through spaces around each hemispherical chamber. The pumping effect at the centers of the spaces between the hemispherical chambers of each sphere can support fluid circulation during a spin.

BRIEF DESCRIPTION OF THE DRAWINGS

In the accompanying drawings forming part of this specification, and in which like reference characters are employed to designate like parts throughout the same:

FIG. 1 defines left and right, as well as front and back, by indicating the Northeast as the forward direction of the vehicle.

DESCRIPTION OF THE INVENTION

Figure 1:
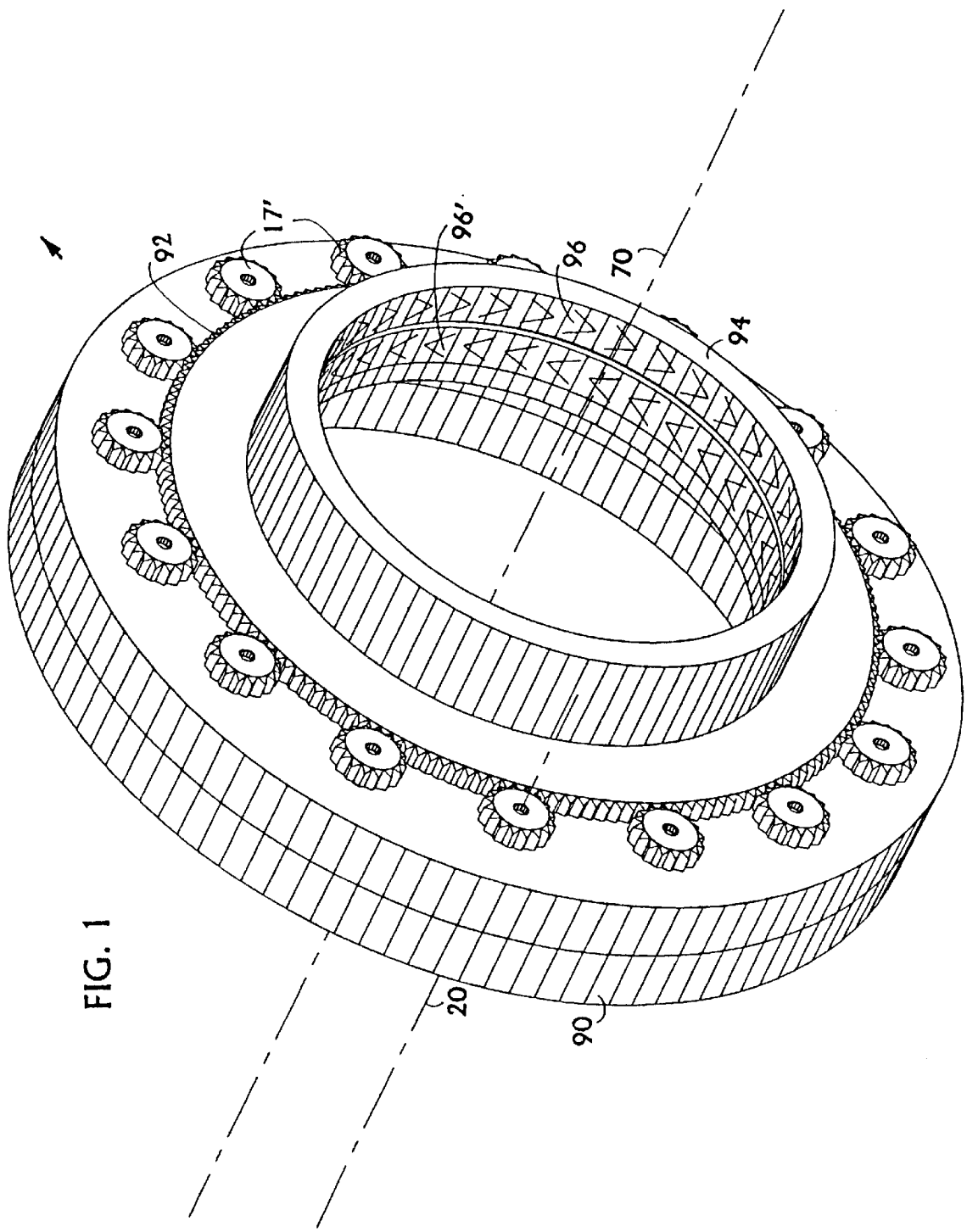
FIG. 1 is a perspective view illustrating the device, herein titled "Energy Wheel". The Energy Wheel, shown without a tire, is positioned to be mounted on a left hub of a vehicle.

Energy Wheels can be adapted to replace wheels of vehicles and crafts and can also be installed about drive shafts. Energy Wheel can house a plurality of spheres, circumferentially arranged, that can spin and accelerate under the influence of centrifugal propellent derived by the rotation of the Energy Wheel. The spinning spheres can cause deceleration of the rotating Energy Wheel and energy stored in them can be retrieved to energize the rotation of said Energy Wheel. Mounted on the left side of a vehicle, as shown in FIGS. 1 and 2, the Energy Wheel would rotate in a clockwise direction when observed from the inside of the forward moving vehicle.

The following are the numbers and the parts they represent in the drawings:

8' sphere, 8" shell, 9 steel ball, 10 secondary axis, 10' secondary shaft, 12 stationary gear, 13 stationary shaft, 14 spindle, 16 drive bevel gear, 17 primary shaft, 17' small gear, 18 drive bearing, 20 primary axis, 21 chamber, 22 window, 22' tunnel, 22" line, 30 third and fourth axes, 30' third and fourth shafts, 40' hemisphere, 60 centrifugal propellent, 69 clockwise braking pad, 69' counterclockwise braking pad, 70 Energy Wheel axis, 82 middle core, 84 big bevel gear, 86 small bevel gear, 88 hole, 90 hull, 91 banded thrust bearing, 92 big central gear, 94 cylinder, 96 clockwise racer, 96' counterclockwise racer.

Figure 2:
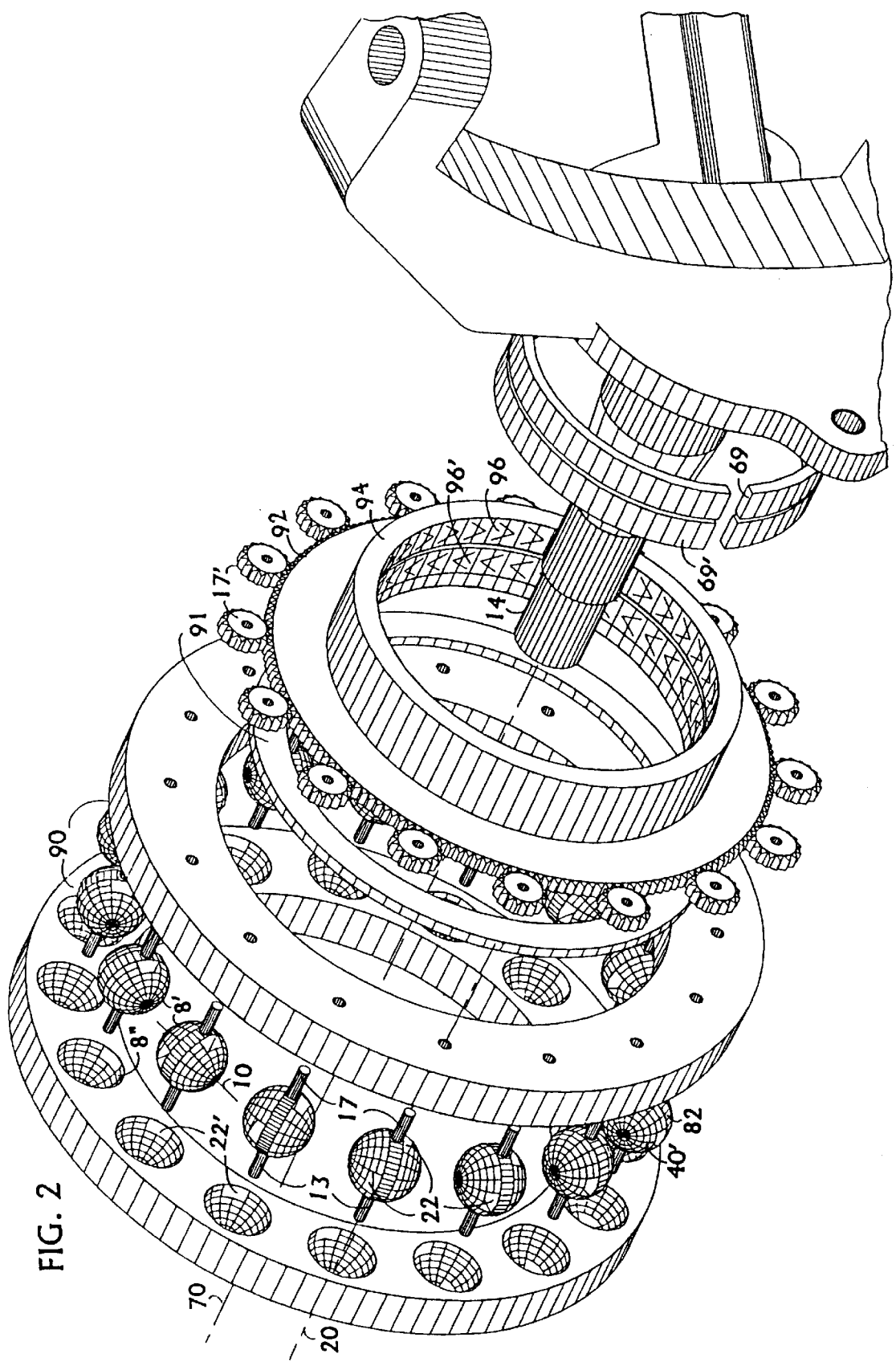
FIG. 2 is an exploded perspective view of the Energy Wheel, depicting the position of the Energy Wheel in relation to spindle 14 of a vehicle and the relation between racers 96, 96' and braking pads 69, 69'. The arrows on the surface of clockwise racer 96 indicate a clockwise rotation of the Energy Wheel when the vehicle moves forward.
Figure 3:
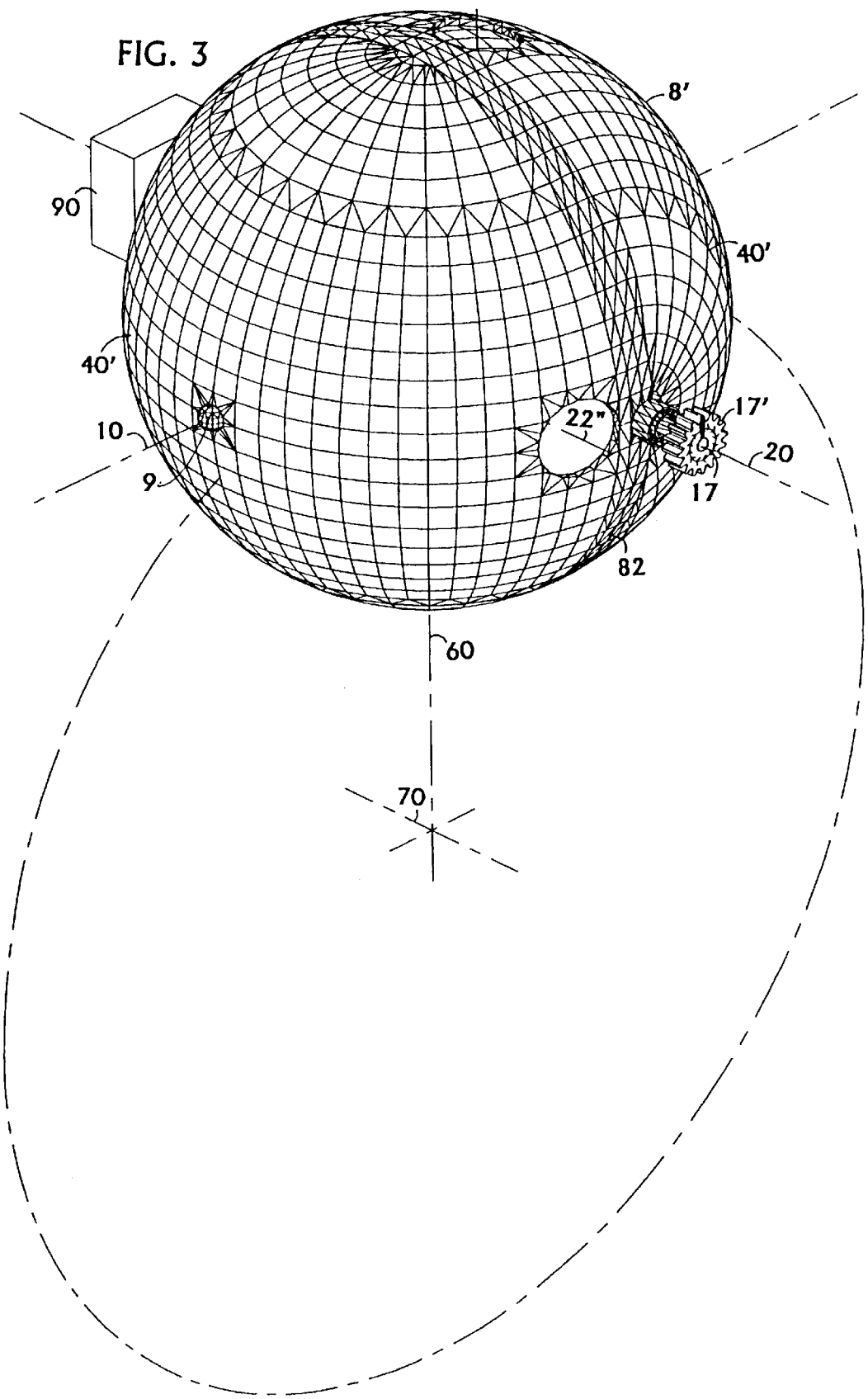
FIG. 3 illustrates one of spheres 8' and the path the spheres travel when the Energy Wheel rotates during the vehicle movement.

FIG. 2 illustrates hull 90 and shells 8". A shell can include openings to tunnels 22', where fluid can circulate. Each sphere 8' is housed in its respective two shells 8", or spherical casing. The space between each sphere 8' and its spherical casing 8", as well as the space between each chamber 21 on either side of the respective middle core 82 and said middle core, can be used for fluid circulation when fluid moves between the outward and inward windows 22 of the front chambers. Windows 22 can overlap the windows in the respective hemispheres 40' and the windows in each sphere can be overlapped by the respective openings to tunnels 22'.

FIGS. 5, 6, 7, and 8 illustrate one sphere 8' and its components. A sphere includes middle core 82 fixed to primary shaft 17. On each primary shaft 17, shown extending from the right side of each sphere, small gear 17' is fixed and meshed with a big central gear 92, as illustrated in FIG. 2. Big central gear 92 can be attached to hull 90 by a banded thrust bearing 91. The band of the banded thrust bearing can be fixed to hull 90 and the its bearing cage can be fixed to big central gear 92. Hence, the banded thrust bearing 91 enables big central gear 92 to rotate freely about the axis of the Energy Wheel, axis 70. Cylinder 94 can be attached to big central gear 92 and to rotate with it. Cylinder 94 can be adapted to detach itself from big central gear 92 to soften any abrupt changes in spin rate of the spheres. Secured within cylinder 94 are two ratchet wheels. The racer of one ratchet wheel can roll only in a clockwise direction and is referred to as clockwise racer 96. The racer of the second ratchet wheel can roll only in a counterclockwise direction and is referred to as counterclockwise racer 96'. Stationary shafts 13, shown extending from the left side of spheres 8', can be fixed to hull 90. The position of stationary shafts 13 can be adjusted so as to control deceleration and acceleration of the vehicle, to neutralize centrifugal propellent 60, or to switch direction of rotations.

A moving vehicle can be slowed down by pushing on the brake pedal to activate the clockwise braking pad 69, which can be mounted on spindle 14. Clockwise braking pad 69 can clutch the surface of clockwise racer 96 and stop the clockwise rotation of cylinder 94 and big central gear 92 and to force spheres 8' to spin in a clockwise direction. The spinning spheres can then be energized under the impact of centrifugal propellent 60, forcing cylinder 94 and big central gear 92 to speed in a counterclockwise direction.

The spin of each sphere 8' about axis 20 and the rotation of chambers 21 about axis 10 can be energized by centrifugal propellent 60 as it acts on mass units, or fluid, within chambers 21 in an outward direction. Since the fluid in the front chamber 21 becomes a column of fluid along line 22" which parallels centrifugal propellent 60, its speed would not be allowed to accelerate as the speed of the fluid at the back chamber would, because line 22" in the back chamber becomes perpendicular to said centrifugal propellent 60. Hence, chambers 21 would spin at the same accelerated speed as that of the back fluid. The higher speed of the chambers, than that of the column of fluid, would force some fluid from the column of fluid to exit the outward window 22 and some fluid to enter the inward window 22. Similarly, a movement of any mass unit along line 22", within the front chamber 21, would not be accelerated as that of the corresponding mass unit within the back chamber 21 would. The mass unit in the front chamber 21 would remain at a slower speed and would move "outward" relative to line 22". The speed of the spin and its acceleration can be controlled by adjusting the position of stationary shaft 13.

Figure 4:
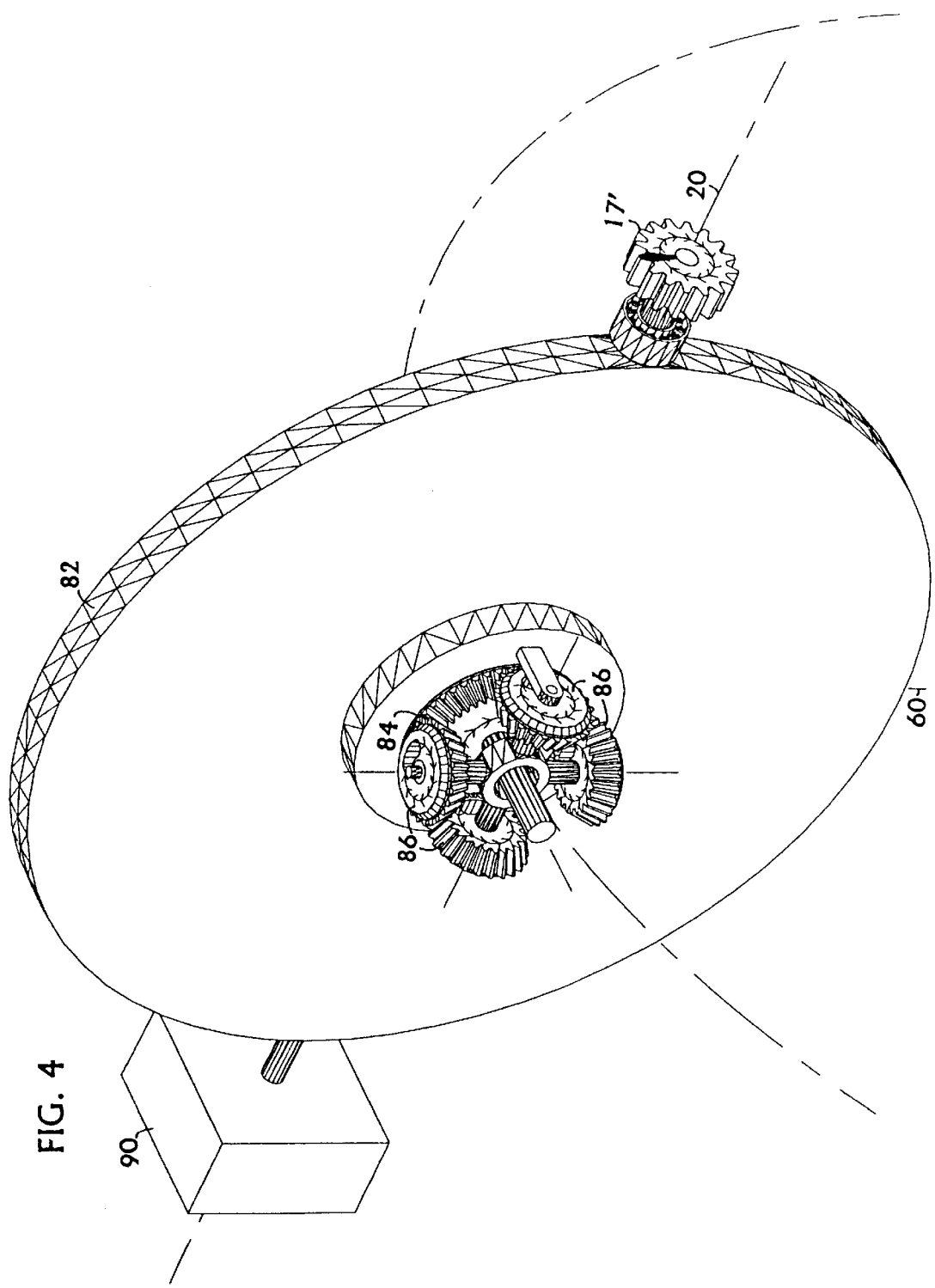
FIG. 4 illustrates a view of a sphere as in FIG. 3, but without hemispheres 40' and without chambers 21, exposing the back of middle core 82 and indicating that there can be space available between middle core 82 and chambers 21 that can produce pumping effect which supports fluid circulation during a spin.

FIGS. 4, 5, 6, 7 and 8, depict secondary mechanism that can support the spin of sphere 8'. The secondary mechanism can include one set of bevel gears at the front and a similar set of bevel gears at the back of middle core 82, as shown in FIG. 4. Each of these sets can include one big bevel gear 84 being meshed with, and drives, two or more small bevel gears 86. The ratio between the big bevel gear 84 and the small bevel gears 86 can be 2:1, the same as the ratio between drive bevel gear 16 and stationary gear 12. Big bevel gears 84 can be fixed to and rotate with secondary shaft 10'. Secondary shaft 10' is fixed to and rotates with drive bevel gear 16 which also drives chambers 21 and hemispheres 40'. Small bevel gears 86 in each set rotate, half of them about the respective third axis 30 and the other half about the respective fourth axis 30, on the third and fourth shafts 30', respectively. Shafts 30' can be fixed to middle core 82, and middle core 82 is fixed to primary shaft 17. Drive bearing 18 can be secured in middle core 82 and would rotate with it, forcing secondary shaft 10' to rotate about primary axis 20 and about secondary axis 10. Each small bevel gears 86 has eccentric hole 88. Holes 88 in front of each sphere 8' can reach, at the same moment, the farthest point away from primary axis 20, and holes 88 in the back of each sphere 8' can reach, at that same said moment, the closest point to primary axis 20, twice, during each cycle of spin. The secondary mechanism can include a shuttle, not shown in the drawings. The shuttle can be adapted to counterbalance any shifts of fluid contained in chambers 21. A rod, which is included in the shuttle, can be made of material lighter than the fluid. The rod can be linked to the respective holes 88 and slide through the center of secondary shaft 10'. The rod linkage with said holes 88 would shift the center of mass of the respective small bevel gears 86 toward said holes and the movement of fluid contained in chambers 21 would counterbalance said shift of center of mass. Spheres 8' can include chamber; 21 and not include the secondary mechanism.

Figure 5:
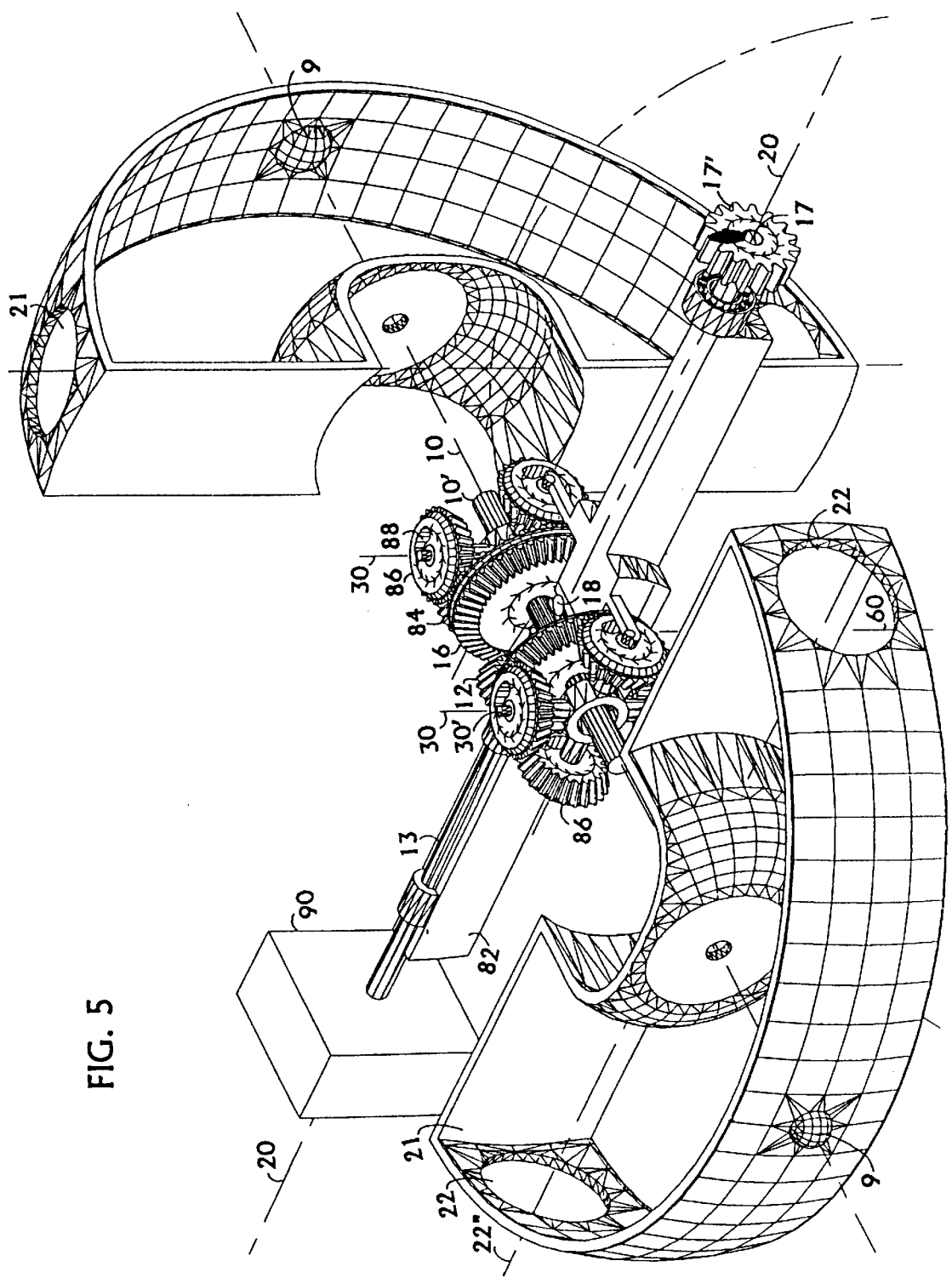
FIG. 5 illustrates the components of each sphere 8'. Shown in the drawings is centrifugal force 60, hereinafter will be referred to is centrifugal "propellent" 60, to distinguish it from centrifugal forces produced by the spinning sphere that can create pressure differentials between its two chambers.
Figure 6:
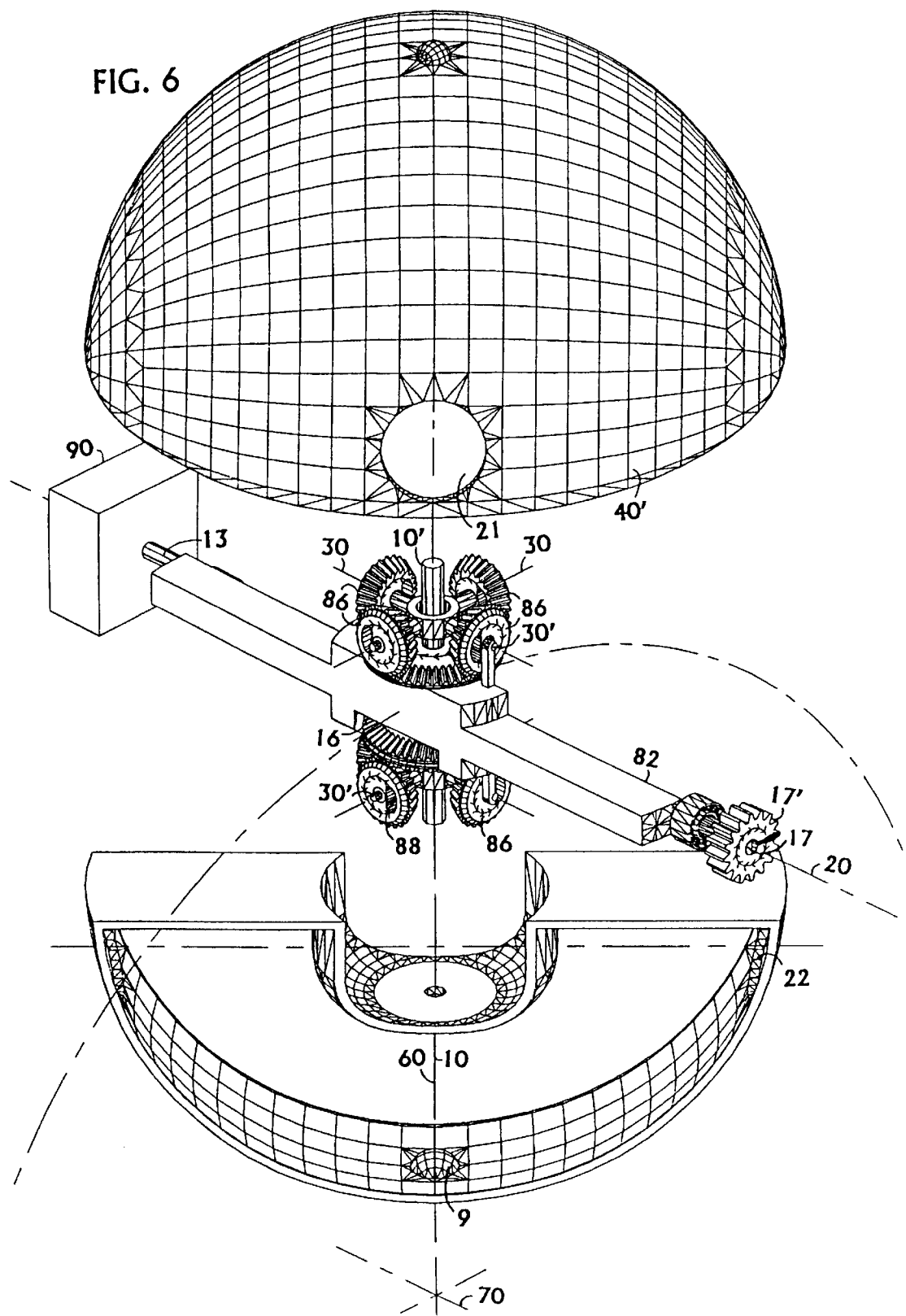
FIG. 6 illustrates the sphere as in FIG. 5, after it made 90 degrees clockwise turn.
Figure 7:
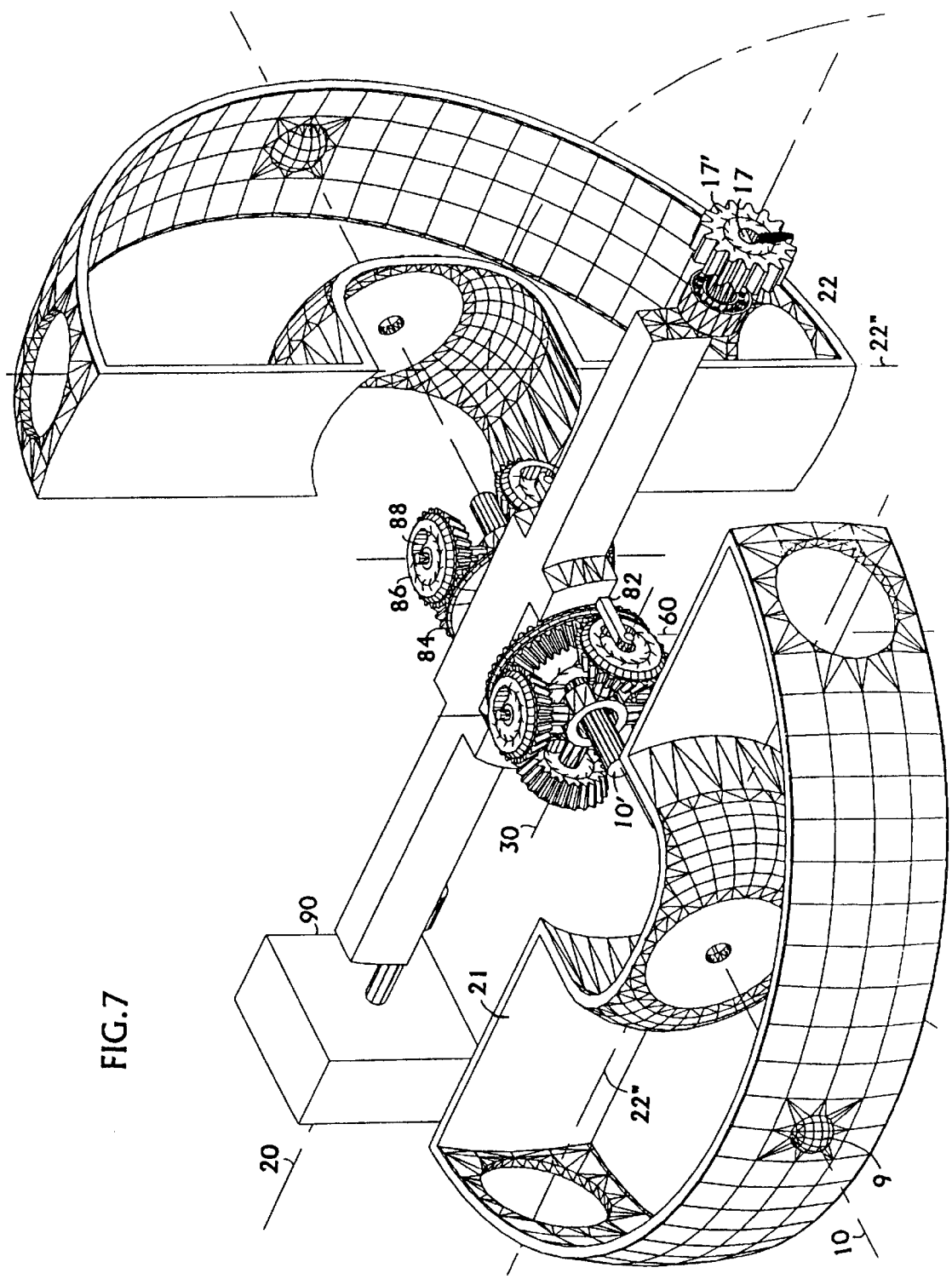
FIG. 7 illustrates the sphere as in FIG. 5, after it made 180 degrees clockwise turn.
Figure 8:
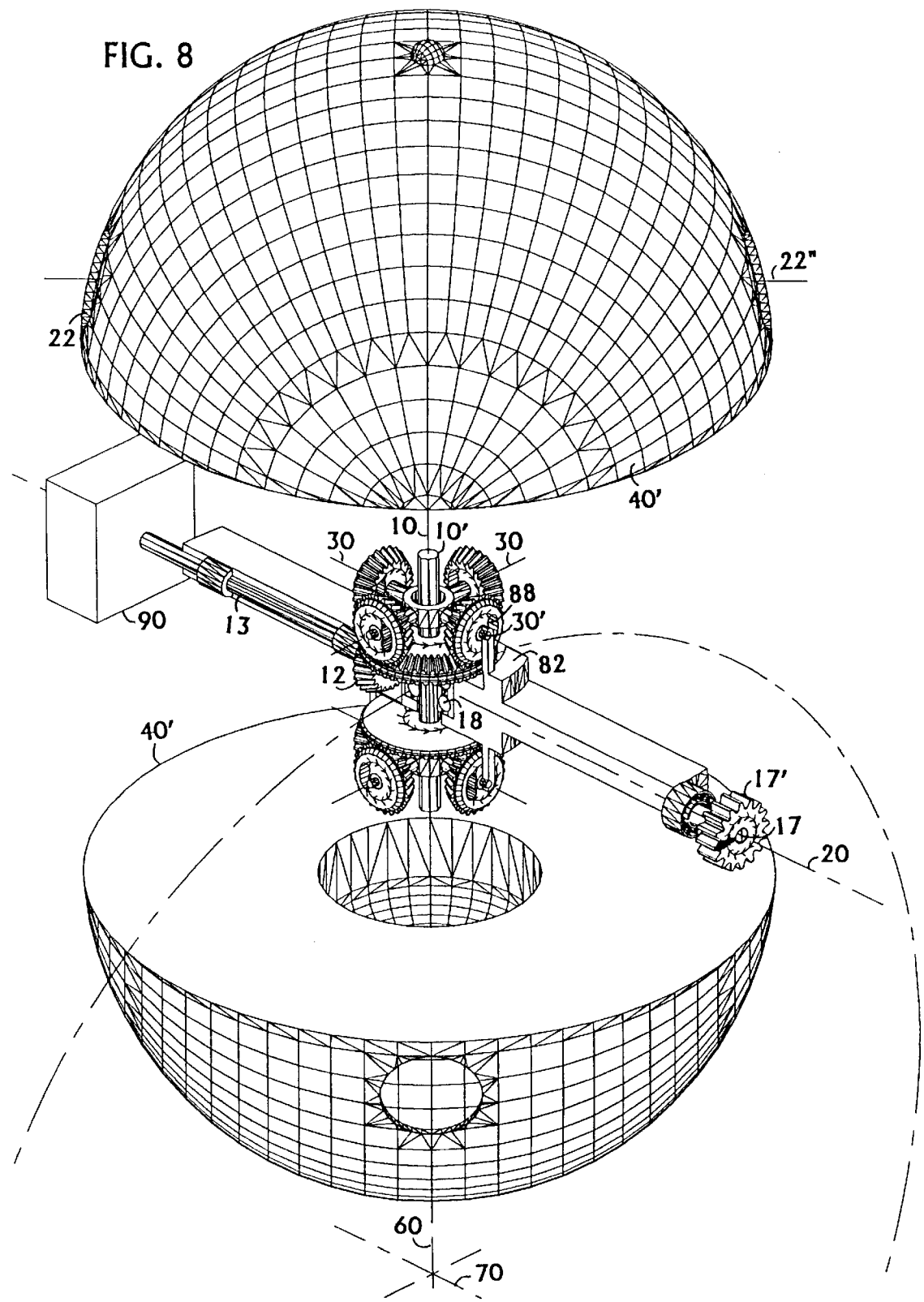
FIG. 8 illustrates the sphere as in FIG. 5, after it made 270 degrees clockwise turn.

FIGS. 5 and 7 illustrate the positions of sphere 8' at two moments in one cycle of spin: at 0 or 360 degrees and at 180 degrees. FIGS. 6 and 8 illustrate the positions of sphere 8' in 90 and 270 degrees. Sphere 8' can maintain a neutral position, when not spinning, in which centrifugal propellant 60 would not have effect on it, both, before the activation of clockwise braking pad 69 and after the spheres have discharged the energy stored in them. Deceleration of the vehicle can be induced by the same motive force which drives the Energy Wheel in a clockwise direction. The motive force can be used to stop the clockwise rotation of big central gear 92 and to cause spheres 8' to spin. The motive force can also be introduced to retrieve energy from the spinning spheres to energize the rotation of the Energy Wheel. A push on a gas pedal, or a throttle, can activate the counterclockwise braking pad 69', which can also be attached to spindle 14. A clutching contact between counterclockwise braking pad 69' and racer 96' can restrain and slow the counterclockwise rotation of cylinder 94 and big central gear 92. Whenever big central gear 92 can no longer rotate freely in a counterclockwise direction, it becomes the medium that can be used to force the spinning spheres to discharge their energy toward energizing the clockwise rotation of hull 90.

Within the short time the gas pedal is pressed, spheres 8' may have discharged all of the energy stored in them. The spheres, again, would move with big central gear 92 and cylinder 94, in a clockwise direction, at the speed of the rotating hull 90, without spinning. As soon as the brake is applied, clockwise braking pad 69 would stop the clockwise rotation of both cylinder 94 and big central gear 92, spheres 8' would spin in a clockwise direction and the energy that is being charged into the spinning spheres would slow down the vehicle.

Small steel balls 9, shown in FIGS. 3, 5, 6, 7 and 8, one at the apex of each hemisphere 40', can be adapted to travel against the rims of the respective shells 8". The steel balls can travel in a circle about primary axis 20 and can hold each sphere firmly between the opposite sides of the respective rims. Small steel balls 9 can also hold hemispheres 40' in a stable position as they rotate about secondary axis 10.

Both, the clockwise braking pads 69 and counterclockwise braking pad 69' can be adapted to render themselves inoperative when the gear of the vehicle is in reverse. Braking pads 69, 69' can also be adapted to be rendered ineffective, manually, when malfunction occurs. The Energy Wheel can be so designed as to include only two small bevel gears 86 installed to mesh directly with drive bevel gear 16.

The Energy Wheel can be incorporated into a stationary structure, or a watercraft. Sea waves can be used to rotate a paddle wheel. As the waves in front of the paddle wheel decelerate and accelerate, back and forth, the spheres within the paddle wheel can be made to spin. Such spin can keep the paddle wheel rotating in one direction so as to be used to generate energy. The device can also be installed at the rims of the intake of a jet engine. The unequal pressures that it creates will compensate for any free flow of air it obstructs and the centrifugal force it produces will eject any object heavier than air from entering the engine.

While this invention has been described with reference to the mechanisms disclosed herein, it is not confined to the details as set forth and is not intended in any way to limit the broad features or principles of said apparatus, or the scope of patent monopoly to be granted. And while the foregoing specification and embodiments of the invention have been set forth in detail for purposes of making a complete disclosure of the invention, it will be apparent to those of ordinary skill in the art that numerous changes may be made in such details without departing from the spirit, concept, and principles of the invention. This Patent Application is intended to cover any modification or changes that may come within the scope of the following claims.

I claim:

1. Apparatus for storing and recovering energy from a motive force, comprising:
   a. storage means including a plurality of energy collectors which are capable of spinning in one direction and which store energy during their spin, said spin being accelerated by centrifugal force derived from said motive force;
   b. means for housing said energy collectors circumferentially about said housing and being connected to said motive force to be cyclically moved, said housing includes spherical casing for each energy collector in which it can spin, spaces within the energy collectors and the housing being filled with fluid;
   c. means for directing said motive force to store energy in said energy collectors;
   d. means for redirecting said motive force to retrieve energy from the spinning energy collectors;
   e. transmission means for linking said energy collectors to said means for directing said motive force to store energy and for linking said energy collectors to said means for redirecting said motive force to retrieve the stored energy.

2. Apparatus as claimed in claim 1, wherein each of said energy collectors, includes:
   a. first drive shaft along first axis;
   b. stationary shaft along said first axis being supported by said housing in an adjustable fixed position;
   c. stationary bevel gear fixed to said stationary shaft;
   d. second drive shaft along second axis being perpendicular to and intersecting said first axis;
   e. first drive bevel gear being meshed with said stationary bevel gear and fixed to said second drive shaft;
   f. center bearing secured in said first drive shaft and being capable of rotating about said first axis at twice the rate of the rotation of its inner racer about said second axis;
   g. two chambers being arranged on either side of said first axis and fixed to said second shaft, each chamber comprising a pair of windows, a straight line joining the centers of the windows in one of said chambers extending in a direction that is perpendicular to the direction of a straight line joining the centers of the windows in the other chamber, so that when one of said straight line becomes perpendicular to said first axis and the other straight line becomes parallel, during said spin, fluid would exit and enter the respective windows under the impact of centrifugal forces.

3. Apparatus as claimed in claim 1, wherein each of said spherical casings, includes:
   a. two shells, a rim to each shell against which two steel balls, holding the spinning energy collector, roll;
   b. apertures to tunnels connecting said spherical casings.

4. Apparatus as claimed in claim 1, wherein said means for directing said motive force to store energy include:
   a. one-direction ratchet wheel;
   b. one-direction braking means.

5. Apparatus as claimed in claim 1, wherein said means for redirecting said motive force to retrieve energy from the spinning energy collectors, include:
   a. counter-direction ratchet wheel;
   b. counter-direction braking means.

6. Apparatus as claimed in claim 1, wherein said transmission means, include:
   a. a gear being mounted on and fixed to each of said first drive shafts;
   b. central gear being meshed with each of the gears;
   c. means for attaching said central gear to said housing and being so constructed as to enable said central gear to rotate about a common axis with said housing, at any speed and at any direction of rotation, in disregard of the speed and direction of rotation of said housing;
   d. means for securing the ratchet wheels to said central gear.

7. Apparatus as claimed in claim 1, wherein each of said energy collectors, further includes:
   a. a pair of second drive bevel gears mounted on and fixed to said second drive shaft and being arranged on either side of said first drive shaft;
   b. two sets of shafts being connected to said first drive shaft, one set on either side of said first drive shaft and being arranged perpendicularly to said second drive shaft;
   c. a pair of bevel gears, with eccentric hole in each, one bevel gear mounted on the respective shaft on either side of said second drive shaft and being meshed with the respective second drive bevel gear;
   d. a rod, with mass lighter than said fluid, being linked to eccentric holes in the respective bevel gears and being so constructed as to cause said rod to slide through the center of said second drive shaft and to displace, and be replaced by, fluid from the respective chambers so as to counterbalance the respective bevel gears.

8. A method for reducing energy waste by storing the same and retrieving it for productive use, including the steps:
   a. housing a plurality of pairs of hemispherical chambers which contain fluid and circumferentially arranged about said housing and being connected to a motive force to be cyclically moved, each pair of said hemispherical chambers is capable of spinning in its respective spherical casing;
   b. using said motive force to cyclically move said pairs of hemispherical chambers around a common axis in one-direction;
   c. securing one-directional ratchet wheel and counter-directional ratchet wheel within a cylindrical casing;
   d. linking each of said pairs of hemispherical chambers to said cylindrical casing so as to enable said cylindrical casing to rotate about said common axis at any speed and at any direction freely and independently from the speed and direction of the cyclically moving pairs of said hemispherical chambers;

e. directing said motive force to stop the one-direction of rotation of said one-directional ratchet wheel so as to force each of said pairs of hemispherical chambers to spin in one-direction and said cylindrical casings to speed in a counter-direction of rotation;

f. causing each pair of said hemispherical chambers to spin faster than the column of fluid which extends between the apertures of the respective hemispherical chamber as it becomes perpendicular to its axis of spin and when under centrifugal force emanating from said motive force;

g. circulating fluid from the outward apertures to the inward apertures of the respective hemispherical chambers through spaces around each hemispherical chamber and through tunnels that connect said pairs of hemispherical chambers;

h. redirecting said motive force to restrain the counter-direction of rotation of said cylindrical casing so as to retrieve the stored energy to energize the cyclically moving pairs of said hemispherical chambers around said common axis in said one direction.

9. A device for recovering energy, comprising:

a. energy collectors for collecting energy;

b. means for housing said energy collectors circumferentially about said housing;

c. motive force for moving said energy collectors in a circle about a common axis in one direction;

d. means for synchronizing the movement of said energy collectors, the synchronizing means having said common axis of rotation;

e. means for attaching said synchronizing means to the housing means so as to enable said synchronizing means. to rotate about said common axis freely and independently from the housing means;

f. means for transforming energy from said motive force wherein the energy stored by the energy collectors is recovered.

10. The device as claimed in claim 9, wherein the housing means, include:

a. two shells for each energy collectors in which it can spin;

b. a rail comprising the rims of said shells against which two steel balls, holding the spinning energy collector, roll.

11. The device as claimed in claim 9 herein the transforming means, include:

a. means for stopping the one direction of rotation of said synchronizing means so as to cause each of said energy collectors to spin about its own axis and to cause said synchronizing means to rotate in the other direction;

b. means for accelerating the spin of each of said energy collectors;

c. means for retrieving the energy stored in the spinning energy collectors.

12. The device as claimed in claim 11, wherein the stopping means, include:

a. first ratchet wheel being attached to said synchronizing means;

b. first braking pad for stopping the rotation of the racer of said first ratchet wheel.

13. The device as claimed in claim 11, wherein the accelerating means, include:

a. two hemispherical chambers forming the spherical energy collector, each hemispherical chamber contains fluid and comprising two apertures, a straight line joining the centers of the apertures in one of said hemispherical chambers extending in a direction that is perpendicular to the direction of a straight line joining the centers of the apertures in the other hemispherical chamber;

b. means for enabling said motive force to rotate said hemispherical chambers about first axis at twice the rate of their rotation about second axis which is perpendicular to, and intersecting, said first axis;

c. means for speeding the hemispherical chambers faster than the column of fluid that stretch between the apertures whose straight line becomes perpendicular to said first axis;

d. means for circulating the fluid that exits from, and enters, the respective apertures.

14. The device as claimed in claim 11, wherein said means for retrieving the energy stored in said spinning energy collectors, include:

a. second ratchet wheel being attached to said synchronizing means;

b. second braking pad for restraining the rotation of the racer of said second ratchet wheel.

15. The device as claimed in claim 13, wherein the enabling means, include:

a. first drive shaft along said first axis;

b. stationary shaft along said first axis being fixed to said housing means in an adjustable position;

c. stationary bevel gear fixed to said stationary shaft;

d. second drive shaft along said second axis being perpendicular to said first axis;

e. first drive bevel gear being meshed with said stationary bevel gear and fixed to said second drive shaft;

f. rotatable bearing secured in said first drive shaft and being capable of rotating about said first axis at twice the rate of the rotation of its inner racer about said second axis.

* * * * *